(12) United States Patent
Basu et al.

(10) Patent No.: US 9,762,653 B2
(45) Date of Patent: Sep. 12, 2017

(54) AUTOMATED CONTENT DELIVERY TO DISTRIBUTED MEDIA OUTLETS

(71) Applicant: iHeartMedia Management Services, Inc., San Antonio, TX (US)

(72) Inventors: Kohinoor Basu, Aliso Viejo, CA (US); Matthew M. Ferry, Eastvale, CA (US); John W. Fulbright, Ogallala, NE (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 15/241,874

(22) Filed: Aug. 19, 2016

(65) Prior Publication Data
US 2016/0359951 A1 Dec. 8, 2016

Related U.S. Application Data

(63) Continuation of application No. 13/872,618, filed on Apr. 29, 2013, now Pat. No. 9,426,017, which is a continuation of application No. 12/382,635, filed on Mar. 19, 2009, now Pat. No. 8,443,046.

(60) Provisional application No. 61/193,218, filed on Nov. 6, 2008, provisional application No. 61/064,665, filed on Mar. 19, 2008.

(51) Int. Cl.
*G06F 15/173* (2006.01)
*H04L 29/08* (2006.01)
*H04L 29/06* (2006.01)
*H04H 60/06* (2008.01)
*G06Q 30/02* (2012.01)
*G06Q 20/14* (2012.01)
*H04H 60/27* (2008.01)

(52) U.S. Cl.
CPC ............ *H04L 67/06* (2013.01); *G06Q 20/14* (2013.01); *G06Q 30/02* (2013.01); *G06Q 30/0241* (2013.01); *G06Q 30/0253* (2013.01); *G06Q 30/0264* (2013.01); *G06Q 30/0283* (2013.01); *H04H 60/06* (2013.01); *H04H 60/27* (2013.01); *H04L 29/06027* (2013.01); *H04L 63/10* (2013.01); *H04L 65/602* (2013.01); *H04L 67/20* (2013.01); *H04L 67/2804* (2013.01)

(58) Field of Classification Search
CPC ....... H04H 60/06; H04L 63/10; H04L 65/602; H04L 67/20
See application file for complete search history.

(56) References Cited

U.S. PATENT DOCUMENTS

| | | | |
|---|---|---|---|
| 5,437,050 A | 7/1995 | Lamb et al. | |
| 7,486,799 B2 | 2/2009 | Rhoads | |
| 7,742,997 B1 | 6/2010 | Brenner et al. | |
| 8,156,004 B2 | 4/2012 | Wajihuddin | |

(Continued)

*Primary Examiner* — Richard G Keehn
(74) *Attorney, Agent, or Firm* — Garlick & Markison; Edward J. Marshall

(57) ABSTRACT

A method can include sending a request to a media content provider requesting media content and receiving the media content and instructions from the media provider. The instructions can be utilized by the media provider to broadcast the media content. The media provider can store the received media content in a database process the instructions then distribute the media content and the instructions to distributed media outlets. The media content provider can receive information indicating that the media content was broadcast by the distributed media outlets according to the instructions.

20 Claims, 4 Drawing Sheets

(56) References Cited

U.S. PATENT DOCUMENTS

| | | |
|---|---|---|
| 8,180,792 B2 | 5/2012 | Fanning et al. |
| 8,239,267 B2 * | 8/2012 | Steelberg ............ G06Q 30/0264 705/14.64 |
| 8,443,046 B2 | 5/2013 | Basu et al. |
| 2002/0095228 A1 | 7/2002 | Corts et al. |
| 2004/0177096 A1 * | 9/2004 | Eyal .................. G06F 17/30017 |
| 2004/0199654 A1 | 10/2004 | Juszkiewicz |
| 2006/0056324 A1 * | 3/2006 | Hyyppa ............... G06Q 20/123 370/310 |
| 2006/0253323 A1 | 11/2006 | Phan et al. |
| 2008/0201140 A1 | 8/2008 | Wells et al. |
| 2008/0228578 A1 | 9/2008 | Mashinsky |
| 2008/0255915 A1 * | 10/2008 | Collins .............. G06Q 10/0631 705/7.12 |
| 2008/0271070 A1 | 10/2008 | Kanojia et al. |
| 2009/0006145 A1 | 1/2009 | Duggal et al. |
| 2009/0254931 A1 | 10/2009 | Pizzurro et al. |
| 2011/0184800 A1 | 7/2011 | Kokernak |

* cited by examiner

AUTOMATED CONTENT DELIVERY TO DISTRIBUTED MEDIA OUTLETS

CROSS-REFERENCE TO RELATED APPLICATIONS

The present U.S. Utility patent application claims priority pursuant to 35 U.S.C. §120 as a continuation of U.S. Utility application Ser. No. 13/872,618, entitled, "Automated Content Delivery to Distributed Media Outlets," filed Apr. 29, 2013, scheduled to be issued as U.S. Pat. No. 9,426,017 on Aug. 23, 2016, which is a continuation of U.S. Utility application Ser. No. 12/382,635, entitled, "Automated Content Delivery to Distributed Media Outlets," filed Mar. 19, 2009, now U.S. Pat. No. 8,443,046, which claims the priority of U.S. Provisional Application No. 61/064,665, entitled "System and Method for Integrated, Automated Inventory Management and Advertisement Delivery," filed Mar. 19, 2008 and U.S. Provisional Application No. 61/193,218, entitled "System and Method for Integrated, Automated Inventory Management and Advertisement Delivery," filed Nov. 6, 2008, all of which are incorporated by reference in their entirety.

INCORPORATION BY REFERENCE

This application also incorporates by reference in their entirety U.S. Utility application Ser. No. 12/382,634 entitled "Real-Time Insertion and Reporting of Media Content," and U.S. Utility application Ser. No. 12/382,636 entitled "Automated Quote Generation and Advertising Buy Placements," both of which were filed Mar. 19, 2009.

BACKGROUND OF THE INVENTION

Technical Field of the Invention

The relevant technological field is media content scheduling and delivery.

Description of Related Art

Radio station systems for delivering advertising and other media content inventory are primarily disconnected and locally operated. Network originated programming and commercial advertising content is usually distributed manually and inefficiently to local media outlets. For example, local media outlets typically either receive a fax, e-mail, or manually visit a website to acquire instructions and content from a network or other media content provider. The visits are typically repeated in a manually-intensive manner often on a daily basis. These repetitive manual processes are inefficient, require a trained staff and are error prone.

Arrangements that provide solutions to the described problems are less than perfect. The few systems that are integrated are connected only locally or in some cases regionally. None of these systems provide an enterprise-wide or nation-wide connection of distributed media outlets. Further, traditional systems offer little in the way of automation, extensibility and near time placement of advertising or other media content across multiple regions. Traditional systems do not enable media content providers to select available spots from nationally distributed media outlets, automatically upload and transmit content to distributed media outlets and receive an automated verification of the broadcast of the media content.

In some embodiments a method is disclosed. The method can include sending a request to a media content provider requesting media content, and receiving the media content and instructions from the media provider. The instructions can be utilized by the media provider to broadcast the media content. The media provider can store the received media content in a database process the instructions then distribute the media content and the instructions to distributed media outlets. The media content provider can receive information indicating that the media content was broadcast by the distributed media outlets according to the instructions.

In some embodiments a system is disclosed. The system can include an enterprise hub, which is operatively coupled to a network and the database. The hub can send the media content request via the network and automatically distribute the media content and the instructions responsive to the processing of the broadcast instructions.

System embodiments can also include a network, a processor operatively coupled to the network, and a database operatively coupled to the processor. The processor can request media content from a media provider via the network, receive the media content and broadcast instructions from the media content provider. The processor can store the received media content in the database. The processor can process the instructions and distribute the media content and the instructions to distributed media outlets. The processor can also receive information indicating if the media content was broadcast by the distributed media outlets according to the instructions. In some embodiments, the processor can automatically distribute the media content based on the processing of the instructions and can instruct the distributed media outlets on parameters for broadcasting the media content.

In yet another embodiment a computer readable medium is disclosed. The medium can be a computer program product embodied as computer usable program code. The computer usable program code can be configured to request media content from a media provider via the network. The code when executed can cause the computer to receive the media content and instruction that facilitate to the broadcasting of the media content from the media content provider. The instructions when executed can facilitate storing of the received media content in a database, processing the instructions, and distributing the media content and the instructions to distributed media outlets in response to the processing of the instructions. The code when executed can instruct the distributed media outlets with respect to airing the media content, and receive information indicating if the media content was broadcast by the distributed media outlets according to the instructions. Other embodiments are also disclosed.

BRIEF DESCRIPTION OF THE SEVERAL VIEWS OF THE DRAWING(S)

The detailed description will refer to the following drawings, wherein like numerals refer to like elements, and wherein.

DETAILED DESCRIPTION OF THE INVENTION

The terminology utilized herein is for the purpose of describing particular embodiments only and is not intended to be limiting of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In some embodiments a method that sends a request to a media content provider and requests media content is disclosed. The methods and systems herein can be referred to as an integrated media content distribution system. As a response to the request the media content and instructions can be received from the media provider. The instruction can facilitate broadcast instructions for the media content and the received media content can be stored in a database. The instructions can be processed and the media content can be distributed to distributed media outlets. The media outlet can receive information indicating that the media content was broadcast by the distributed media outlets. Such information can be sent according to the instructions. In some embodiments an enterprise hub, can be operatively coupled to a network and a database, and the hub can send the media content request via the network and in response to processing instructions that outlet can automatically distribute the media content and the instructions and broadcast the media content.

The term broadcast as utilized herein should be given a broad and expansive meaning to include any form of transmission or distribution of content to the public. The term broadcast should also include without limitation transmission or distribution via terrestrial radio, satellite radio, Internet radio, television, satellite television, Internet transmissions and the like. Broadcasting as utilized herein also encompasses unicasting, multicasting, pod casting and all formats of Internet communications.

Figure 1:
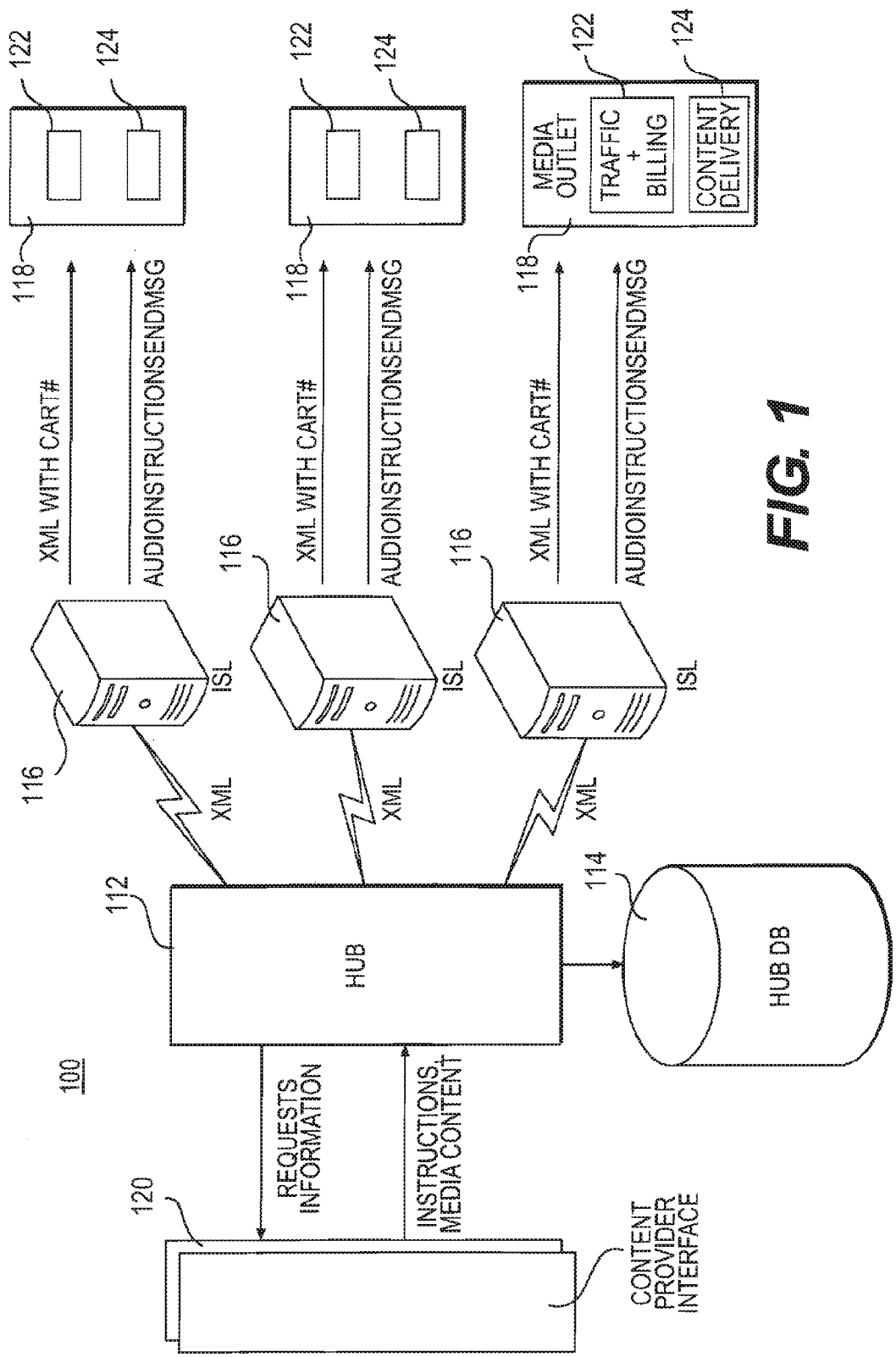
FIG. 1 is a block diagram of components that can facilitate content delivery to distributed media outlets.

Referring to FIG. 1 a block diagram of an integrated media content distribution system 100 is depicted. The components of the system 100 can be utilized to facilitate performing the methods described herein. In some embodiments system 100 can enable the automated delivery of media content from media content providers to distributed media outlets who can broadcast the media content. Media content, as used herein, should be given its broadest meaning encompassing any form of media content that may be broadcast, including without limitation, advertising spots, including both audio and/or video advertising and audio and/or video programming, such as live and recorded talk shows, events, such as sports events, to name a few.

System 100 can include enterprise hub 112, enterprise hub database 114, one or more integrated services layers (ISLs) 116, distributed media outlets 118 and media content provider interface 120. Distributed media outlets 118, as used herein, can encompass local media outlets (e.g., local radio and television stations) that may be distributed in multiple markets, an entire market of local media outlets (e.g., all of the radio or television stations in a particular city), regional media outlets (e.g., regional radio and television stations), national media outlets, and media outlets that broadcast via the Internet or satellite, and combinations thereof. Distributed media outlets 118 may include transaction delivery systems such as traffic and billing systems 122 and media delivery systems 124. The transaction delivery systems may each serve single media outlets or multiple media outlets. Likewise, a media outlet may be served by multiple transaction delivery systems. For example, each local media outlet may have a transaction delivery system (i.e., traffic and billing system 122 and media delivery system 124), an entire market of local media outlets may share a transaction delivery system or other combinations of distributed media outlets may share a transaction delivery system. Likewise, a media outlet may be served by multiple transaction delivery systems.

Enterprise hub 112 can transmit and receive messages, instructions, media content, programming logs or any information that the public may be interested in. Enterprise hub 112 can communicate with media content provider interface 120 and, through ISLs 116, can communicate with distributed media outlets 118. Enterprise hub 112 can be an aggregation layer for ISLs 116 and for media content provider interface 120, thereby interconnecting media content providers with distributed media outlets 118. Enterprise hub 112 can include a web service with one or more servers that are connected to a network. The enterprise hub 112 can store instructions and programming code that is executed by one or more servers.

In some embodiments a processor, as part of the enterprise hub 112, can be adapted to request media content from a media provider via the network and can be adapted to receive the media content and instructions from the media content and in response to the instructions can broadcast the media content. The enterprise hub can also store the received media content in the database 114, process the instructions and distribute the media content and the instructions to distributed media outlets. In some embodiments that enterprise hub 112 can receive information indicating if the media content was broadcast by the distributed media outlets substantially in accordance with the instructions. In some embodiments, the processor can automatically distribute the media content in response to processing the instructions and the processor can instruct the distributed media outlets on the desired parameters for broadcasting the media content. Enterprise hub 112 may provide data, media and instruction to media content provider interface 120, possibly in the form of web sites or webpages, and such data can be accessed by media content providers, via media content provider workstations. Allowing such access allows for a user to make selections and input information to the system. Many different network components can be connected to enterprise hub 112 via the network. Network could be any kind of network such as a virtual private network, a local area network or a wide area network such as the Internet.

In some embodiments enterprise hub database 114 can store various information, as controlled by enterprise hub 112. For example, enterprise hub database 114 can store messages, instructions and media content received from media content providers (e.g., from media content provider interface 120) under the control of hub 112. Enterprise hub database 114 may store unique identifiers assigned to each media content provider. Therefore, each media content provider can have an ID, that is, a unique identifier that is assigned to a specific media outlet. The media outlet can be a station identifier (ID), and other unique identifiers can also be assigned to media content. One such identifier can be a Cart number or identifier. These unique identifiers may be generated by enterprise hub 112 or other components of system 100 or by a remote system not shown. Enterprise hub database 114 can also store configuration data for each media content provider interface. The configuration data can be generated by enterprise hub 112. Enterprise hub database 114 can be maintained by a server as part of the enterprise hub 112 or as a part of a separate database server.

Media content provider interface 120 can be an outward looking electronic interface to media content provider that can select media outlets and markets by submitting instructions for broadcasting of media content. Interface 120 can also provide media content, and can facilitate review and proofing of broadcast performance. Media content providers can include entities that provide media content. Such entities can include programming and advertising for broadcasting on media outlets 118. Media content providers may be entities that act as advertisers, advertising agencies, advertising brokers, or any one or entity that is in the business of advertising. Media content providers can be enterprise partners in a partnership agreement or can be other entities that sell advertising on a national or regional level where the advertisers desire to place advertising content on distributed media outlets, such as local or regional radio stations. In some embodiments, advertising time spots (avails) that are not sold nationally by media content providers can be marked as available to the local media outlet to sell to local advertisers. Media content providers may also be enterprise partners or other media companies that own media content, such as syndicated radio or television programs, and want to broadcast this media content via multiple distributed media outlets.

Media content providers may also be direct advertisers (e.g., Fortune 50 companies) that want to directly control, place and broadcast advertising with multiple distributed media outlets. Some embodiments of media content provider interface 120 may include a graphical user interface that presents information to media content provider users and allows the media content provider users to view, enter and select information, including instructions for broadcasting the media content. Media content provider interface 120 may also include an associated file transfer protocol (FTP) site that enables the transfer of files, including media content files and instructions, to enterprise hub 112. Enterprise hub 112 may automatically request and receive files from media content provider FTP site. The enterprise hub 12 can connect to media content provider interface 120 via the Internet.

Only one media content provider is illustrated however system 100 may include a plurality of media content provider interfaces 120. In some embodiments there could be many different media content providers, both internal and external to the enterprise system where the providers can access and utilize the features of the system 100 and the enterprise hub 112. Enterprise hub 112 may provide customized media content provider interfaces 120 for each different media content provider or it may provide a uniform media content provider interface 120 to one, all or many of the media content providers.

ISLs 116 can serve as multidirectional gateways to inject, extract, organize and route messages and media content between distributed media outlets 118 and enterprise hub 112. Various transactions or communications between system 100 components can be facilitated by ISLs 116. For example, communications regarding instructions, media content, scheduling logs, preemptions, schedule availability claims, and streams of information indicating what is currently being played on a distributed media outlet can all be facilitated by ISLs 116. Further communications regarding whether media content has been played as scheduled (e.g., "now playing" data), identifications of media outlets or stations, product codes, industry codes and status updates that are generated and sent by transaction delivery systems of distributed media outlets 118 can be communicated among ISLs 116 enterprise hub 112 and distributed media outlets 118.

In some embodiments messages in an extensible markup language (XML) (always define acronyms) can be utilized in communications between ISLs 116 and enterprise hub 112. These XML messages can include a Cart number that identifies media content presented for broadcast. The XML messages can also include media content broadcast instruction messages that can be sent between TSLs 116 and distributed media outlets 118. In some embodiments, there may be one ISL 116 for each distributed media outlet 118. In other embodiments ISLs 116 can service multiple distributed media outlets 118 and there may be redundancy of ISLs 116 (multiple ISLs 116 serving same distributed media outlet 118). Such a configuration can provide redundancy, fail safe and backup features that can enhance system robustness. ISLs 116 may also be located at distributed media outlets 118. ISLs 116 may be incorporated into distributed media outlet 118 systems, such as transaction delivery systems.

Distributed media outlets 118 can be embodied as radio stations, television stations, an Internet server and any media outlet that can broadcast content. Distributed media outlets 118 may serve one or more local, national or regional markets. Distributed media outlets 118 can include transaction delivery systems that may include traffic and billing systems 122 and media (e.g., audio) delivery systems 124. Traffic and billing systems 122 may handle orders (e.g., instructions for broadcasting media content, such as advertising) and billing for fulfillment of such orders. Media delivery systems 124 may handle the playing of the media content.

Figure 2:
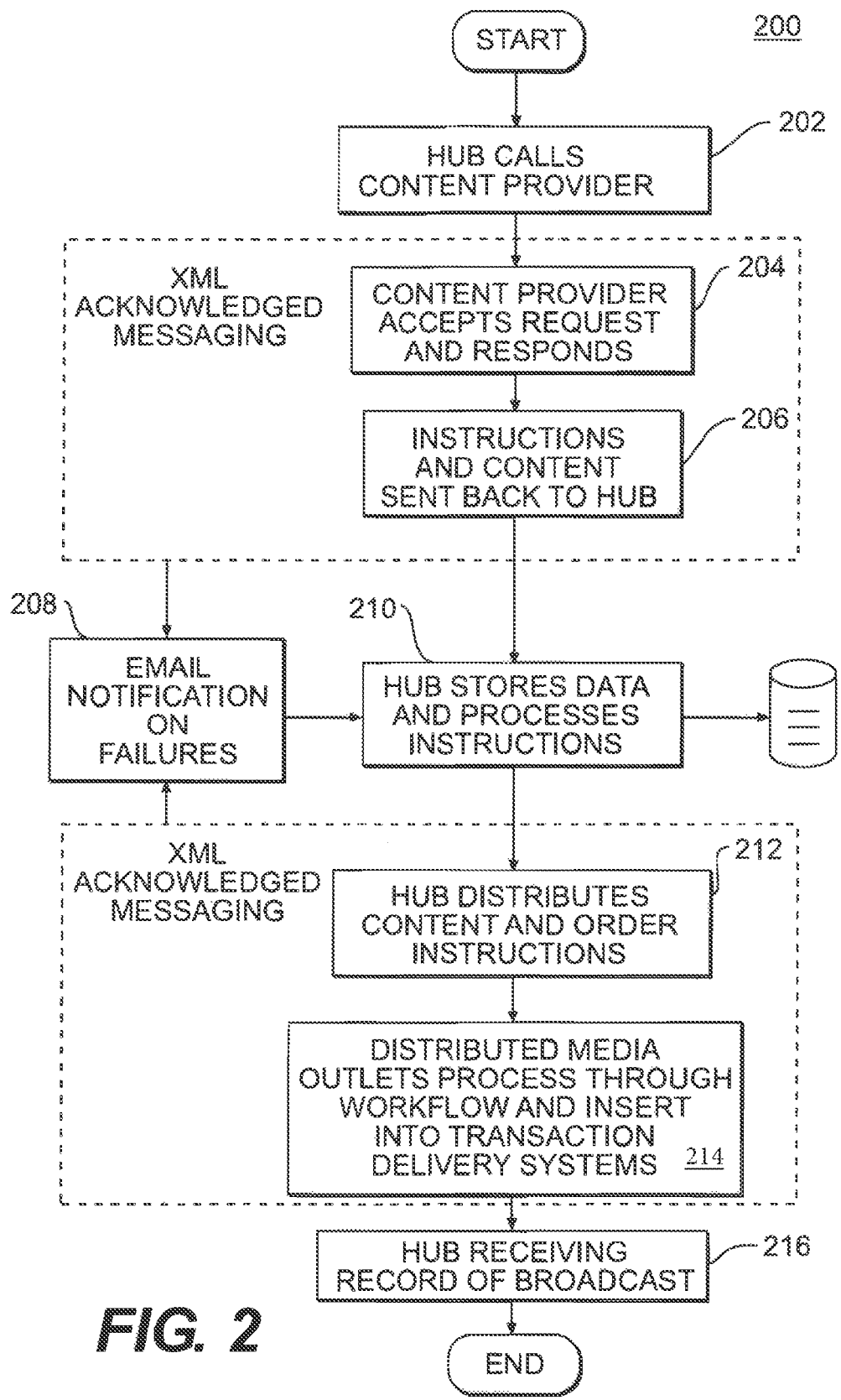
FIG. 2 is a flow diagram for content delivery

Referring now to FIG. 2, a flowchart is provided that illustrates a method 200 for distributing media content. In operation enterprise hub can call media content provider, as illustrated in block 202. The call may be a request for media content sent to a media content provider. The request can be displayed on a media content provider graphical user interface. In some embodiments, an automated request can be sent to an FTP site maintained by the media content provider. In some embodiments, the request can be sent via a public or private network, such as the Internet. The request may include information identifying specific content requested by the advertiser.

The media content provider can accept the request and respond to the request as illustrated in block 204. Media content and instructions can be sent back to the enterprise hub, as illustrated by block 206. The media content and instructions may be sent in together in successive packets over the same communication channel or they can be sent separately in time and channel. The displayed media content can then be reviewed, possibly edited and then selected by a user of the media content provider interface. In some embodiments, the FTP site of the media content provider can automatically send media content to the outlet in response to information sent by enterprise hub identifying the media content or per instructions previously entered by a user. The instructions can include instructions to broadcast the media content.

In some embodiments, the requests, instructions and content may be sent utilizing XML acknowledgement messaging. XML acknowledged messaging can provide reliable messaging and can enable high reliability communications that can be easily tracked. If a message is not successfully received, an electronic mail failure notification will typically be automatically sent by enterprise hub, ISL or other components of system, to the sender, as illustrated in block 206.

In some embodiments, enterprise hub can receive the media content its corresponding instructions from the media content provider. In some embodiments, the enterprise hub can store the received media content and instructions in a database and can process the instructions, as illustrated in block 210. The enterprise hub can process the instructions and can determine where to send the media content. Responsive to processing the instructions, the enterprise hub can automatically distribute the media content to the outlets and send instructions to one or more distributed media outlets, as illustrated in block 212.

The distributed media outlets can automatically process the instructions linked to the content and can provide for the insertion of media content into transaction delivery systems, including traffic and billing systems, as illustrated in block 214. The distributed media outlets can broadcast the media content according to the processed instructions. In some embodiments, the distributed media outlets can transmit information indicating whether the media content was broadcast in substantially in accordance with the instructions. The information can be a record of the broadcast and the information can be inserted and transmitted into a continuous stream referred to herein as a "now playing" stream. This stream can indicate what is currently playing on one or more media outlets. The records or information via the stream may be transmitted to the media content provider via the enterprise hub. As illustrated by block 216, enterprise hub can receive the broadcast record. The enterprise hub may transmit the record via the media content provider interface. Verification of the broadcast may be performed, e.g., by the enterprise hub or the media content provider interface.

Figure 3:
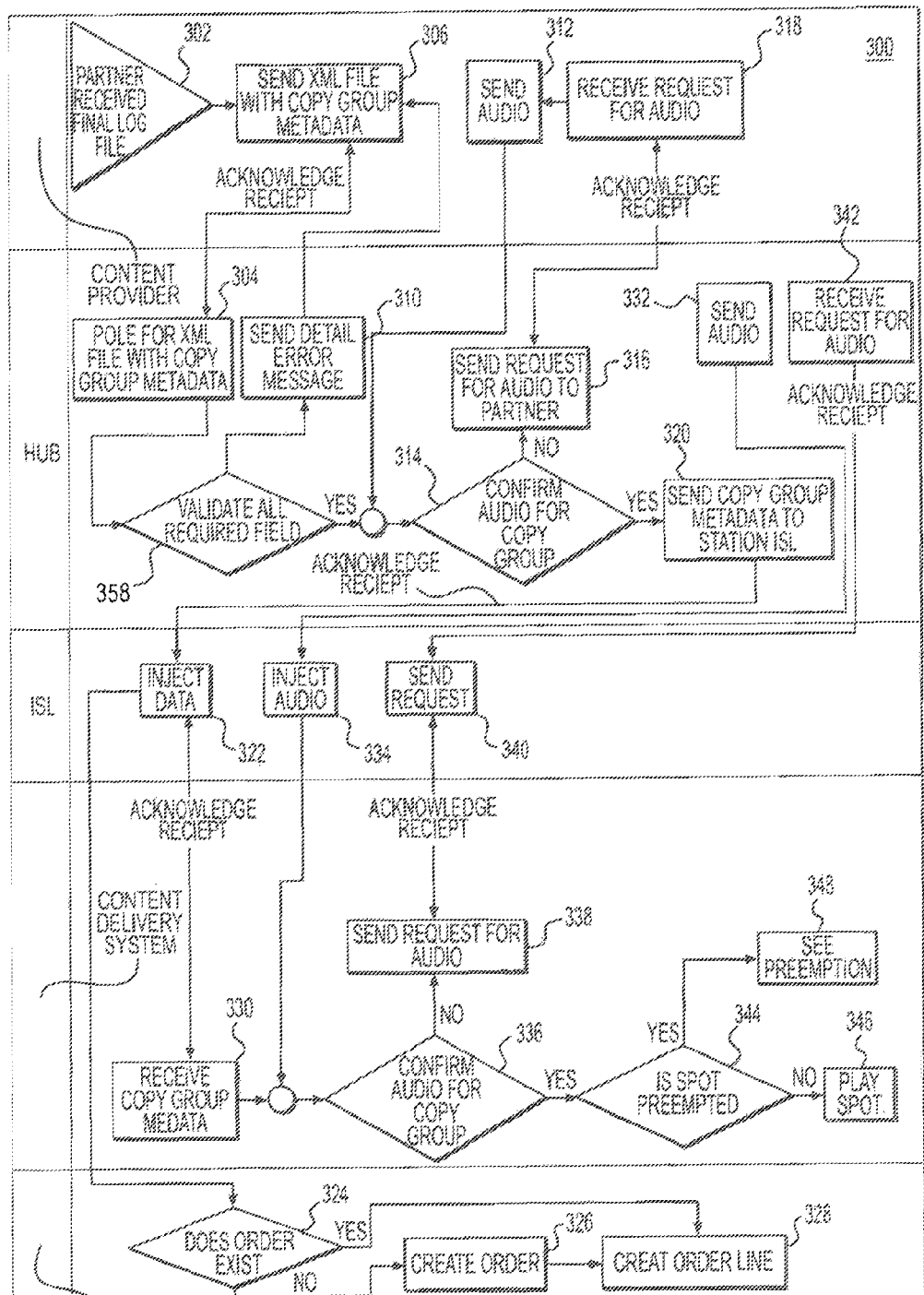
FIG. 3 is another flow diagram depicting a method for content delivery.

FIG. 3 is a flowchart 300 illustrating features of a media content distribution system. Initially a media content provider can receive a final unperfected log file from the transaction delivery system via media content provider interface, as illustrated in block 302. In some time sensitive embodiments, the transaction delivery systems may send out non-final versions of an unperfected log prior to midnight. In other embodiments, the unperfected log can be sent out at 12:00 AM one day prior to day of the anticipated play slot for content as part of a final unperfected log file. In other words, the media outlet can be prohibited from making changes to the unperfected log until media content providers submit their avail claims and the claims are processed.

The Enterprise hub may request or poll the media content provider interface for broadcasting instructions from media content provider, as illustrated by block 304. The instructions may be in the form of an XML file that includes copy group metadata. The XML file can be a file that is prepared by the media content provider and the file can include instructions for broadcasting media content. Also included in the instructions can be copy group metadata, which can identify metadata, such as a media content file identifier (ID), media content provider ID, and industry and/or product codes for the media content to be broadcast. In some embodiments, if media content is an advertisement spot, this metadata can identify the industry and/or product of each advertisement spot that may be submitted by media content provider.

Media content provider may send instructions to the enterprise hub in an XML format via media content provider interface, as illustrated by block 306. Enterprise hub and media content provider interface may acknowledge receipt of these messages using XML acknowledged messaging. Enterprise hub 112 can validate the received instructions, and can verify that all the specific data fields are substantially complete, as illustrated by block 358. In one example, enterprise hub may verify that metadata includes metadata identifying the industry and/or product for each advertisement spot that is submitted by media content provider for each of its claimed spots. If the metadata is not or cannot be validated, enterprise hub can send an error message to media content provider interface, as illustrated in block 310. The process may be repeated until major errors are addressed.

If the instruction messages can be validated, enterprise hub can determine that enterprise hub has received media content (e.g., audio) from media content provider Media content provider can send media content to enterprise hub through media content provider interface, as illustrated by block 312. In the example shown, audio or video can be sent across the network. Enterprise hub can confirm that the received media content is the media content identified in the instructions (e.g., XML file), as illustrated by block 314. If the system cannot confirm, enterprise hub can send a request for the media content to media content provider interface, as illustrated by block 316. Media content provider interface can receive the request, as illustrated by block 318. Media content provider can send the requested media content to enterprise hub, as illustrated by block 312. This process can repeat until the identified media content is sent and receipt of such content is confirmed by the system. If receipt is confirmed, enterprise hub can send the instructions for broadcasting (e.g., copy group metadata) to the appropriate distributed media outlet ISLs, as illustrated by block 320.

ISLs can acknowledges receipt of the content and provide such an acknowledgement to enterprise hub and can inject or transmit the instructions (e.g., the metadata) into distributed media outlet delivery system, as illustrated by block 322. In some embodiments, ISLs can inject instructions into traffic and billing system and media content delivery system of distributed media outlets simultaneously. Different playlists can be maintained by traffic and billing system and audio delivery system may be synchronized utilizing such a simultaneous injection.

In some embodiments, the media content delivery system can be configured as a NexGen Digital™ traffic and billing system available from Clear Channel Management The system can manage nearly every aspect of a content delivery system including logs, media content advertising spots, music, video, a main playlist, and other data to facilitate operation of a distributed media outlet. A traffic and billing system such as VIERO RMS™, also available from Clear Channel Management, may only contain advertising spots, both media content advertising provided by media content provider and advertising from market local to distributed media outlet, if any and a playlist or log of the advertising spots. Media content delivery system and traffic and billing system can constantly re-synch playlists to ensure that content is played when it is scheduled to play. For example, if a traffic and billing system spot playlist indicates that an advertising spot will play at 7:00 AM, and scheduled audio on main playlist would have a break at 6:58 AM, media content delivery system can insert some audio, e.g., a 2-minute song, etc., to re-sync with the spot playlist and accordingly play an advertising spot at 7:00 AM.

Utilizing this synchronization feature, media content delivery system can shuffle spots in response to changes to the main audio playlist or in response to a bump of an advertising spot, possibly because of unexpected change to audio playlist. Specifically, if an advertising spot is moved from its assigned time in the preliminary log, or if a break is shortened, transaction delivery system can shuffle advertising spots in an attempt to play all the advertising spots that have been selected by an advertiser. The disclosed transaction delivery system can apply various rules and/or contract requirements to avoid playing spots in a conflicting manner when shuffling occurs.

For example, transaction delivery system can try to avoid playing advertising spots from same industry or from competitors consecutively or within a certain time frame of each one another. Also, certain rules or contract requirements may dictate that certain advertising spots be played within a certain time period, during a certain radio program or adjacent a certain type of song. The transaction delivery system can apply these rules and requirements so that re-scheduled spots do not violate. If an advertising spot is in violation, transaction delivery system can automatically shuffle the advertising spots until the violations are eliminated or in some cases minimized. Transaction delivery system can also apply these rules and requirements to advertising spots when there is some other change in programming that would not necessitate the moving of the advertising spots, but would change, for example, the type of music or programming played adjacent to the advertising spot. If changing the programming would cause a scheduled advertising spot to be in violation of a rule or requirement, transaction delivery system can automatically shuffle the advertising spot to a different time.

In some embodiments ISL can inject the metadata into traffic and billing and audio delivery systems. The media content can be embodied as an advertising spot. Traffic and billing system can determine whether an order exists for the advertising spot, as illustrated in block 324. If the instructions were for a preemption spot an order may already exist. However, if an order does not exist, traffic and billing system can create an order, as illustrated by block 326. Once the order is created, traffic and billing system creates the order line, as illustrated by block 328.

Meanwhile, media content delivery system can receive the instructions (e.g., copy group metadata), as illustrated by block 330 and may await the media content (in example here, audio advertising spot). Enterprise hub can send the media content to the ISL for the distributed media outlet, as illustrated by block 332, which can inject the audio into media content delivery system, as illustrated by block 334. Media content delivery system can confirm the media content is the media content specified in the instructions (e.g., the audio for the copy group indicated by the copy group metadata), as illustrated by block 336. If not, media content delivery system can send a request for the correct media content to ISL, as illustrated by block 338. ISL can forward the request to enterprise hub, as illustrated by block 340. Enterprise hub can receive the request for the correct media content, as illustrated by block 342, and can send the correct media content, e.g., from stored media content in enterprise hub database, repeating the process until media content delivery system confirms correct. If enterprise hub does not have correct media content stored in enterprise hub database, it may re-request the media content from media content provider. Media content delivery system may determine if media content is preempted, as illustrated by block 344. If not preempted, media content delivery system can play media content, e.g., audio advertising spot, as illustrated by block 346. If preempted, media content delivery system may not play original media content but can look for and play preemption media content, as illustrated by block 348. As described herein, media content delivery system may transmit a stream of information indicating what media content it is currently playing. This stream of information may include information indicating whether the media content provided by the media content provider played per the instructions.

Method 300 is shown being performed for a distributed media outlet. As noted above, distributed media outlet can encompass multiple distributed media outlets, including entire local markets and other combinations. Additionally, method 300 may be repeatedly and simultaneously performed for multiple distributed media outlets by system 100. In other words, media content provider may transmit instructions instructing enterprise hub to automatically load media content intro a plurality of distributed media outlets. The same media content, e.g., the same advertising spot, different media content, or a collection of media content (related or otherwise), may be automatically loaded per method 300 into a plurality of distributed media outlets per instructions from the media content provider. Accordingly, method 300 may simultaneously or nearly simultaneously repeat functions described above, for example, blocks 320 through 348 for each of a plurality of distributed media outlets as described in instructions received from media content provider.

Figure 4:
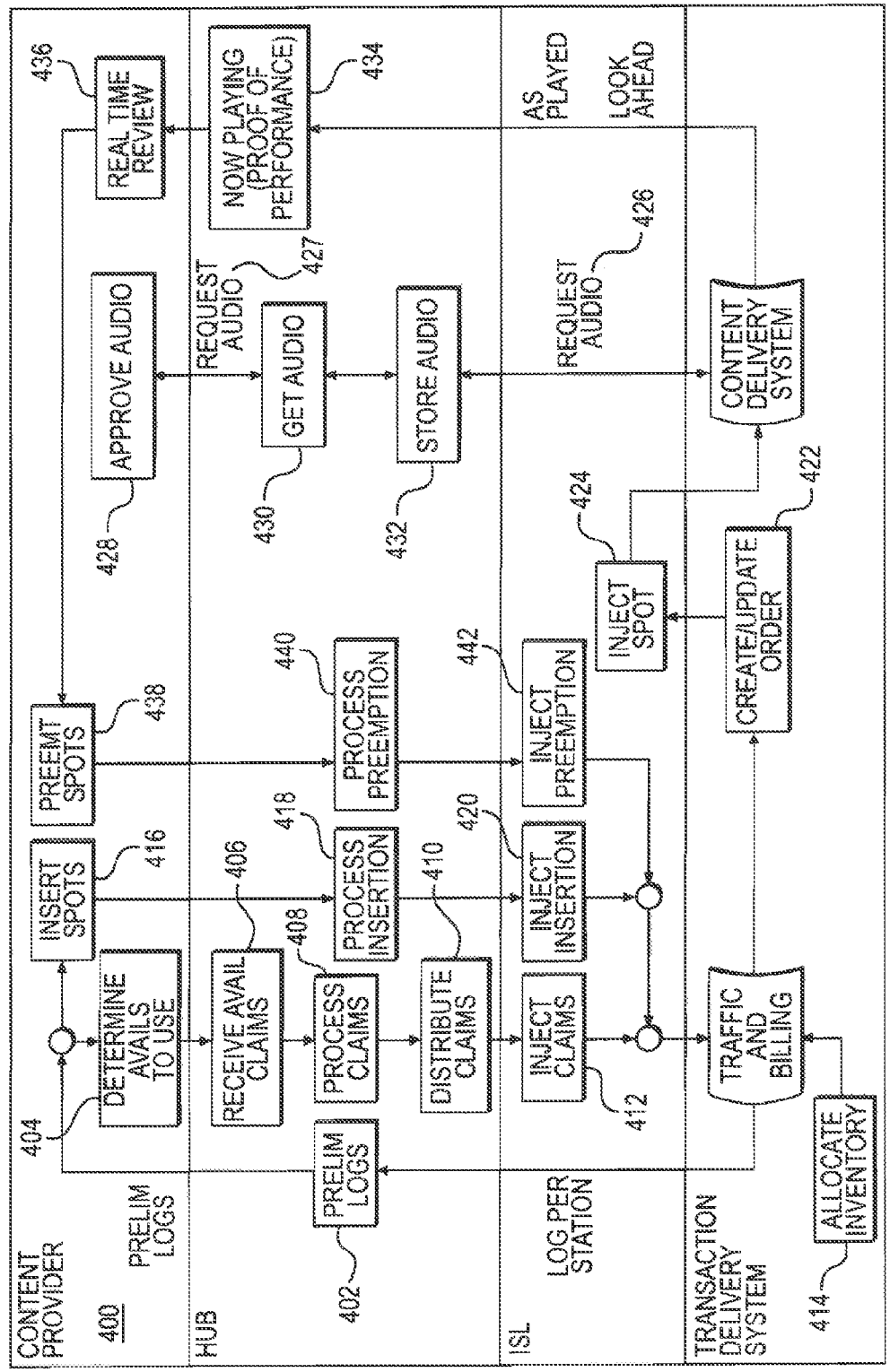
FIG. 4 is a flow diagram illustrating yet another method for delivering content.

Referring now to FIG. 4, a flow diagram illustrating an overview of operations of embodiments of system 100 is provided. Media content providers accessing system 100 at media content provider interfaces may seek to insert media content (e.g., advertising sports) into programming (e.g., radio programming) on various distributed media outlets utilizing embodiments of method 400 shown here. Preliminary or unperfected logs can be automatically and regularly transmitted from transaction delivery systems to the media content provider interface via enterprise hub, as illustrated by block 402, can inform media content provider of avails (i.e., spots of time available for an advertising spot or other programming) for various distributed media outlets. In other words, the unperfected logs can display dedicated avails inventory available on distributed media outlets of system 100. These logs may be sent from multiple transaction delivery systems on a per distributed media outlet (e.g., per radio station) basis.

An unperfected log can show aspects of a media outlet's schedule for a day. In some embodiments, an unperfected log can show a media content provider's contracted for avails in the media outlet's schedule and the surrounding programming, or context, for the media content provider's avails. A media content provider may contract for these avails, and may choose to use its contracted avails or not use them; the surrounding programming is reserved for the media outlet's use. An unperfected log can be called "preliminary" because the unperfected log has not been updated with a media content provider's avails claims; the unperfected log can be the log sent prior to the media content provider submitting its avails claims. In embodiments, media outlets may send their "final" unperfected log at midnight, twenty-four hours before the day shown in the log (the "day of play"). Media content providers may know this is the final version of the unperfected log and that the media outlet may not subsequently change the unperfected log. Media outlets may send earlier versions of the unperfected log prior to this time, and media content providers may understand that these earlier versions may change. However, utilizing these earlier versions, media content providers to anticipate what the final unperfected log may be and make initial determinations of avails claims. In embodiments, the final unperfected log may be sent at midnight, twenty-four hours before the day of play, may remain unchanged from an earlier version. On a given night on which a media outlet transmits its final unperfected log at midnight for the day of play, the media outlet may also transmit any number of unperfected logs for subsequent days (e.g., radio station transmits at 12:00 AM Monday the final unperfected log for Tuesday, and unperfected logs for Wednesday-Friday). These other non-final unperfected logs may be changed any number of times before their "final" deadline or remain unchanged.

In embodiments, media outlets transaction delivery systems can generate and maintain logs, actual or local logs, representing the media outlet's schedule for each day. The unperfected logs transmitted to system 100, as discussed above, may be copies of the local logs. The unperfected logs transmitted to system 100 can be used by media content providers to claim avails and to insert the actual media content, as discussed herein. Avail claims can be communicated to the transaction delivery systems and inserted into the local logs. On the day of play, the local log may be the actual, planned schedule of advertising spots, or spot playlist, for the media outlet, including spots ordered and scheduled for media content providers, or others, and local market spots. This playlist may be merged with the other programming (e.g., songs, talk show, new, etc.) to form the media outlet playlist for the day.

With continued reference to FIG. 4, media content provider can use media content provider interface to view unperfected logs, listed avails and other log information. Media content provider may determine what avails to use based on this information and enter the selected or claimed avails into media content provider interface, as illustrated by block 404. Media content provider interface may transmit this information, the avails claims (e.g., the contractually-reserved spaces in the distributed media outlet schedule for which media content provider wishes to submit media content (e.g., an advertising spot)), to enterprise hub. In embodiments, the transmission of avails claims may occur sometime almost immediately after midnight, i.e., almost immediately after the final unperfected log is sent (e.g., for Tuesday day of play, final unperfected log is sent at 12:00 AM Monday morning and avails claims submitted by 12:05 AM Monday morning). For example, media content provider may enter and transmit an identifier for the avails it wishes to claim using media content provider interface. In an embodiment, media content provider can use the media content provider interface to edit the unperfected log, insert the media content provider's ID into the spots media content provider wishes to claim and transmit or upload the edited unperfected log.

In embodiments, enterprise hub can receive the avail claims (e.g., the uploaded log), as illustrated by 406, and can process the avail claims, as illustrated by block 408. When processing avail claims, enterprise hub may create a revised unperfected log for each distributed media outlet or market in which media content provider is submitting an avail claim. Enterprise hub can insert avail claims into the log for each distributed media outlet or market to create preliminary revised log. In other words, in place of avails shown in unperfected logs, enterprise hub can insert media outlet provider's claims. Enterprise hub may receive claims (e.g., uploaded logs) from multiple media content providers and may process all uploaded logs together to form one preliminary revised log for each distributed media outlet or market.

After processing, enterprise hub can distribute the avail claims to various ISLs for distributed media outlets in which media content provider has submitted an avail claim, as illustrated by block 410. The ISLs can receive the claims and inject the claims into actual or local logs of distributed media outlets media content delivery and traffic and billing systems, block 412. These transaction delivery systems can allocate local inventory into the actual logs, block 414, and receive the injected claims. These transaction delivery systems can update the local logs (e.g., the unperfected logs transmitted as described above) and transmit the updated logs to the media content provider interface via the enterprise hub. As noted above, these updated logs can be sent from multiple distributed media outlet transaction delivery systems on a per media outlet (e.g., per radio station) basis. The updated logs may include a status of the claimed avails. Consequently, media content provider interfaces can receive the updated logs from multiple distributed media outlet to which they have sent avail claims.

Media content provider interfaces can insert media content (e.g., advertising spots) utilizing the updated logs, as illustrated by block 416. In other words, media content provider interfaces can transmit instructions for media content to enterprise hub for insertion into the local logs. This typically can occur around 9:00 PM the day prior to the airing of the media content. Enterprise hub can receive and process the insertion (i.e., the instructions), as illustrated by block 418 (see, e.g., FIG. 3). Enterprise hub can determine to which ISL(s) to transmit the instructions. ISL can receive and inject the insertion (i.e., the instructions) into the appropriate distributed media outlet(s) transaction delivery systems, as illustrated by block 420. Transaction delivery systems can create or update an order, as illustrated by block 422. An order may be a standing order or placeholder for media content. Media content providers can indicate they want to place media content (e.g., an advertising spot) in a certain time slot, e.g., 24 hours before the slot. By a certain time of day, media content providers can provide the media content (e.g., the advertising spot). In some embodiments, up to a certain time, e.g., 15 minutes, before the slot, the medic content providers can swap out the media content for different media content (a.k.a., a "preempt"). After creating or updating the order as illustrated by block 422, transaction delivery systems can inject the media content instructions into the log, as illustrated by block 424. Traffic and billing system may transmit insertion through ISL to media content delivery system.

If a new media content, transaction delivery systems can request the media content (e.g., audio) specified in the instructions sent and in the order created, as illustrated by block 426. If the enterprise hub database does not already have the requested media content, enterprise hub can forward the request to the media content provider interface, as illustrated by block 427. Media content provider may approve and transmit the media content, as illustrated by lock 428. Enterprise hub can receive the approved media content, as illustrated by block 430, store the approved media content in the enterprise hub database for future access, as illustrated by block 432, and transmit the approved media content to the transaction delivery systems via ISL. Transaction delivery systems can receive the media content from enterprise hub via ISL. If the media content is previously played media content (e.g., a previous advertising spot), the media content may be retrieved from the storage at the enterprise hub database.

In some embodiments, transaction delivery systems can transmit a now playing record of the media content (e.g., an advertising spot) as it plays in real-time to the enterprise hub, block 434. In some embodiments, transaction delivery systems can transmit the record on system 100 as part of a continuous, ticker feed or stream of information that enterprise hub may make available for viewing on media content provider interface. The media content provider can utilize the record to perform a near real-time review and verification of the media content, as illustrated by block 436. Based on the near real-time review, a media content provider may decide to preempt media content, as illustrated by block 438. A spot preemption can insert a different spot or some other content in place of an already injected spot. Media content provider interface can transmit the preemption content to enterprise hub, which can process the pre-emption, as illustrated, by block 440, and can determine to which distributed media outlet the preemption should be transmitted. Enterprise hub can forward the preemption to the appropriate ISL(s), which can inject the preemption, as illustrated by block 442, so that distributed media outlet transaction delivery systems may inject as described above. Transaction delivery system may also generate reports and conduct billing and collection for display and action through media content provider interface.

The near real time review that can provided by the continuous, ticker feed or stream of information allows near real time verification of played advertisements and automatic make good of advertisements that did not air correctly due to a failure. In embodiments, advertisements that broadcast successfully within parameters established by an order can be acknowledged and marked as verified within seconds after they play. Any failed advertisements can be acknowledged and marked as "exceptions" within seconds, and can then automatically "re-inserted" by transaction delivery systems into an appropriate future slot, e.g., through the use of the dynamic Booking Agent, see U.S. application Ser. No. 11/419,492, which is incorporated by reference. The failed spot can be re-inserted with potentially adjusted priority levels to ensure successful execution. This process utilizes a synchronous near real time communication method that then triggers business rules and scheduling algorithms to perform a once fully manual belated process Described below are various processes that can be performed by embodiments of system 100 along a time-line. The example described below is for media content that is a radio advertising spot. The time-line and the processes that can be performed are centered or based upon functions or processes performed by media content provider and media content provider interface. The times discussed somewhat arbitrary but are illustrative of a typical performance of embodiments of system 100. At 12:00 AM, twenty-four hours prior to day of play, enterprise hub can receive and filter station logs from distributed media outlets. As noted above, media content providers may act as advertising brokers. Distributed media outlet unfiltered logs can contain the specifics of what spots will be played when, including the identification of the advertiser for each spot. Filtering the station logs can remove the identification of the advertiser and any other information that should not be shared with media content providers. In place of advertiser identification, logs may indicate type of business advertising for each spot already placed (e.g., instead of McDonalds™, filtered log indicates "restaurant" or "fast-food restaurant"). A filtered log can be transmitted to media content provider interface for display to media content provider. Sometime immediately after 12:00 AM, twenty-four hours prior to day of play, media content provider can make a final determination of which spots to claim and can transmit claimed spots to enterprise hub. Typically, this occurs by 12:05 AM day prior to day of play. Enterprise hub can inject claimed spots, transmitting the claimed spots to the appropriate media outlet transaction delivery systems. Media outlet transaction delivery systems can receive and register the claimed block or blocks and may release the unclaimed blocks to local market for local market advertising.

Sometime later, typically prior to and around 09:00 PM day prior to day of play, media content provider can inject spots and determine spot details for each of its spots, including audio content and transmits spot metadata using media content provider interface. Enterprise hub may receive and transform the spot metadata (i.e., the instructions for broadcasting the spot) and the audio content for the spot. The media content provider typically uses a particular metadata format; the enterprise hub transforming transforms the media content provider formatted metadata to a format distributed media outlet transaction delivery systems can use. Enterprise hub can transmit spot metadata (the instructions for broadcasting) and audio content to distributed media outlets. In the example here, enterprise hub can transmit transformed spot metadata, e.g., via ISL, to a traffic and billing system, which can create the details of the media content provider's orders for avails, i.e., "order lines", and transmit transformed spot metadata and audio content to the media content (i.e., audio) delivery system. The media content delivery system can automatically place the spot in the media content delivery system planned playlist for future play based on processing the spot metadata (i.e., processing the instructions for broadcasting). These automatic functions can be performed for each of media content provider's claimed avails prior to midnight day of play. These functions can be performed iteratively as these functions are repeated for as many spots and as many stations that media content provider has placed claims.

These automatic functions may also be repeated shortly before airing of a spot, for example, just prior to 15 minutes before play time. As above, media content provider can determine spot details and transmits spot metadata (i.e., instructions for broadcasting the advertising spot), in this case, changing the spot details and metadata. Enterprise hub may receive and transform the spot metadata and the audio content. Enterprise hub may transmit spot metadata and audio content to distributed media outlet delivery systems. Here, distributed media outlet traffic and billing system can create or change order lines (depending on whether new spot or spot preemption (replacement spot) and the media content delivery system can place the spot in the planned playlist. Media content provider can change or submit a new advertising sport (or other media outlet) very shortly before the scheduled broadcasting time, e.g., up to 15 minutes prior to broadcasting time (time can be set closer to broadcasting time −15 minutes allows sufficient margin of error to avoid potential problems—e.g., network congestion, communication problems or failures, corrupted files, etc.). At broadcasting time, distributed media outlet media content delivery system can play spot.

As will be appreciated, some embodiments may be embodied as a system, method or computer program product. Accordingly, some embodiments may take the form of an entirely hardware embodiment, an entirely software embodiment (including firmware, resident software, microcode, etc.) or a combination of software and hardware aspects that may all generally be referred to herein as a "circuit," "module" or "system." Furthermore, some embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

In fact, the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may facilitate the propagation of data signals with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Embodiments are described with reference to flowchart illustrations and/or block diagrams of methods, apparatus (systems) and computer program products.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. The embodiments were chosen and described in order to best explain the principles and the practical application, and to enable others of ordinary skill in the art to understand various embodiments with various modifications as are suited to particular uses contemplated.

What is claimed is:

1. A method comprising:
   receiving, at an enterprise hub coupled to a plurality of distributed media outlets via a communications network:
      media content, including an advertisement spot, from a content provider, the media content to be broadcast by one or more of the plurality of distributed media outlets; and
      linked instructions from the content provider, the linked instructions linking to the media content and including:
         copy-group metadata identifying an industry associated with the advertisement spot, and
         broadcast parameters used by a transaction delivery system associated with the one or more of the plurality of distributed media outlets to insert the media content into a broadcast;
   processing the linked instructions at the enterprise hub to determine the one or more of the plurality of distributed media outlets to which the enterprise hub will transmit the media content;
   verifying completeness of the linked instructions, wherein verifying completeness includes verifying that the copy-group metadata is substantially complete; and
   in response to verifying completeness of the copy-group metadata, transmitting, via the communications network, the media content and the linked instructions to the one or more of the plurality of distributed media outlets, wherein the one or more of the plurality of distributed media outlets insert the media content into an associated transaction delivery system in accordance with the linked instructions.

2. The method of claim 1, further comprising:
   receiving, at the enterprise hub, a broadcast record indicating the media content that was broadcast by the distributed media outlet in accordance with the linked instructions.

3. The method of claim 2, wherein the broadcast record indicating content currently being broadcast by the distributed media outlet.

4. The method of claim 2, further comprising:
providing broadcast verification to the content provider by transmitting the broadcast record from the enterprise hub to the content provider using the communications network.

5. The method of claim 1, wherein the transaction delivery system comprises a traffic and billing system.

6. The method of claim 1, further comprising:
processing the linked instructions at the enterprise hub to determine when the enterprise hub is to transmit the media content and the linked instructions.

7. The method of claim 1, further comprising:
associating, at the enterprise hub, a unique identifier with the media content; and
distributing the unique identifier with the media content to the distributed media outlet.

8. The method of claim 1, wherein transmitting the media content and the linked instructions includes:
transmission using extensible markup language (XML) acknowledgment messaging.

9. An enterprise hub comprising:
a memory storing a program of instructions;
a communications interface; and
a processor coupled to the memory and the communications interface;
the program of instructions that upon execution cause the processor to:
receive via the communications interface:
media content, including an advertisement spot, from a content provider, the media content to be broadcast by a distributed media outlet; and
linked instructions from the content provider, the linked instructions linked to the media content and including:
copy-group metadata identifying an industry associated with the advertisement spot, and
broadcast parameters used to facilitate insertion of the media content into a transaction delivery system of the distributed media outlet;
processing the linked instructions using the processor to determine when the enterprise hub will transmit the media content and the linked instructions;
verify that the linked instructions are complete prior to transmitting the media content and the linked instructions to the distributed media outlet, wherein verifying completeness includes verifying that the copy-group metadata is substantially complete; and
in response to verifying completeness of the copy-group metadata, transmit, via the communications interface, the media content and the linked instructions to the distributed media outlet, wherein the distributed media outlet inserts the media content into the transaction delivery system in accordance with the linked instructions.

10. The enterprise hub of claim 9, wherein the program of instructions is further configured to cause the processor to:
receive a broadcast record indicating the media content that was broadcast by the distributed media outlet in accordance with the linked instructions, the broadcast record to enable verification of the broadcast.

11. The enterprise hub of claim 10, wherein the broadcast record indicating content currently being broadcast by the distributed media outlet.

12. The enterprise hub of claim 10, wherein the program of instructions is further configured to cause the processor to:
providing broadcast verification to the content provider by transmitting the broadcast record to the content provider using the communications interface.

13. The enterprise hub of claim 10, wherein the program of instructions is further configured to cause the processor to:
associate a unique identifier with the media content;
distribute the unique identifier with the media content to the distributed media outlet; and
insert the unique identifier associated with the media content into the broadcast record transmitted to the content provider.

14. The enterprise hub of claim 9, wherein the program of instructions is further configured to cause the processor to:
process the linked instructions at the enterprise hub to determine one or more distributed media outlets of a plurality of distributed media outlets to which the enterprise hub will transmit the media content.

15. The enterprise hub of claim 9, wherein the program of instructions is further configured to cause the processor to:
transmit the media content and the linked instructions using extensible markup language (XML) acknowledgment messaging.

16. The enterprise hub of claim 9, wherein the linked instructions include metadata associated with the media content, and wherein the program of instructions is further configured to cause the processor to:
verify that the metadata associated with the media content includes an industry identifier prior to transmitting the media content to the distributed media outlet.

17. A system comprising:
a plurality of distributed media outlets coupled to a communications network, wherein each of the plurality of distributed media outlets includes a transaction delivery system including at least one processor and associated memory; and
an enterprise hub including at least one processor and associated memory, the enterprise hub coupled to the communications network, the enterprise hub configured to:
receive, from a content provider via the communications network:
media content, including an advertisement spot,
copy-group metadata identifying an industry associated with the advertisement spot, and
linked instructions associated with the media content;
verify completeness of the linked instructions, wherein verifying completeness includes verifying that the copy-group metadata is substantially complete;
make a determination that at least one distributed media outlet of the plurality of distributed media outlets is to deliver the media content identified by the linked instructions accompanying the media content;
in response to verifying completeness of the copy-group metadata, transmit the media content and the linked instructions to the at least one distributed media outlet of the plurality of distributed media outlets in accordance with the determination; and
wherein the at least one distributed media outlet of the plurality of distributed media outlets configured to:
receive the media content and the linked instructions; and
broadcast the media content via the transaction delivery system in accordance with the linked instructions.

18. The system of claim 17, wherein the distributed media outlets further configured to:

transmit, to the enterprise hub using an extensible markup language (XML), a broadcast record indicating the media content that was broadcast in accordance with the linked instructions.

19. The system of claim 18, wherein the enterprise hub is further configured to:
receive the broadcast record indicating that the media content that was broadcast in accordance with the linked instructions; and
transmit, to the content provider, the broadcast record indicating that the media content that was broadcast in accordance with the linked instructions.

20. The system of claim 17, wherein verifying completeness of the linked instructions includes:
validating completeness of metadata associated with the media content prior to transmitting the linked instructions to the distributed media outlet.

* * * * *